United States Patent [19]

Muller

[11] Patent Number: 4,807,141
[45] Date of Patent: Feb. 21, 1989

[54] POSTAGE METER WITH MICROPROCESSOR CONTROLLED RESET INHIBITING MEANS

[75] Inventor: Arno Muller, Westport, Conn.

[73] Assignee: Pitney Bowes Inc., Stamford, Conn.

[21] Appl. No.: 809,593

[22] Filed: Dec. 16, 1985

[51] Int. Cl.[4] ............................................. G06F 13/00
[52] U.S. Cl. ................................ 364/464.02; 364/900; 364/466
[58] Field of Search ............... 377/31, 32, 17; 371/10; 365/227, 229, 228; 364/466, 483, 550, 900

[56] References Cited

U.S. PATENT DOCUMENTS

| | | | |
|---|---|---|---|
| 4,253,015 | 2/1981 | McFiggans et al. | 235/92 |
| 4,285,050 | 8/1981 | Muller | 364/900 |
| 4,323,987 | 4/1982 | Holtz et al. | 365/229 |
| 4,445,198 | 4/1984 | Eckert | 364/900 |
| 4,484,307 | 11/1984 | Buatse | 364/900 |
| 4,534,018 | 8/1985 | Eckert et al. | 365/228 |
| 4,547,853 | 8/1983 | Eckert | 364/900 |
| 4,564,922 | 1/1986 | Muller | 364/900 |

Primary Examiner—Parshotam S. Lall
Assistant Examiner—Ellis B. Ramirez
Attorney, Agent, or Firm—Michael J. DeSha; David E. Pitchenik; Melvin J. Scolnick

[57] ABSTRACT

In a postage meter which includes a computer, a power supply for energizing the computer, a non-volatile memory for storing postage meter operating data, and wherein the computer includes a microprocessor adapted for processing the operating data, there is provided an improvement for protecting the operating data. The improvement comprises: the computer including (a) apparatus for detecting respective high level and low level output voltage signals from the power supply; (b) a first switching circuit operable in response to the detection of a high level output voltage signal for providing a power-up signal to the microprocessor and operable in response to the detection of a low level output voltage signal for providing a power-down signal to the microprocessor; (c) a second switching circuit operable in response to the detection of said high level signal for providing a not-reset signal to said microprocessor and operable in response to the detection of said low level signal for providing a reset signal to said microprocessor; and (d) apparatus for enabling operation of the non-volatile memory after the microprocessor has been provided with the power-up and not-reset signals, wherein the non-volatile memory enabling apparatus includes gate structure operable in response to timely receiving at least two respectively predetermined input signals for enabling the microprocessor to transfer said operating data between the microprocessor and the non-volatile memory, the non-volatile memory enabling apparatus includes a buffer circuit timely operable by the microprocessor for providing one of said two signals, and the microprocessor includes instrumentalities programmed for timely operating said buffer circuit and timely providing another of said two signals; and (e) third switching responsive to operation of the buffer circuit for inhibiting the operation of the second switching circuit to prevent the provision thereby of a reset signal to the microprocessor after the microprocessor is provided with a power-down signal and until the microprocessor has transferred the operating data from the microprocessor to the non-volatile memory.

7 Claims, 5 Drawing Sheets

POSTAGE METER WITH MICROPROCESSOR CONTROLLED RESET INHIBITING MEANS

BACKGROUND OF THE INVENTION

This invention is generally concerned with methods and apparatus for protecting data in a computer during power failure conditions and more particularly for protecting current operating data in an electronic postage meter upon the occurrence of a power failure condition.

Numerous systems have been designed to preserve information stored in electronic memory units during power failures. Examples of systems of this type are shown in U.S. Pat. No. 3,676,717 for NON-VOLATILE FLIP-FLOP MEMORY CELL; U.S. Pat. No. 3,859,638 for a NON-VOLATILE MEMORY UNIT WITH AUTOMATIC STANDBY POWER SUPPLY; and U.S. Pat. No. 4,049,951 for DATA DETECTION APPARATUS. Such systems generally involve sensing the power failure and taking measures to insure that data is not lost, such as by employing an auxiliary source of power for providing standby power when the primary power supply experiences a failure condition, and loading the data into a non-volatile memory prior to loss of standby power. Other U.S. patents which show systems to protect stored information are U.S. Pat. No. 3,801,963 for METHOD AND APPARATUS FOR TRANSFERRING DATA FROM A VOLATILE DATA STORE UPON THE OCCURRENCE OF A POWER FAILURE IN A COMPUTER; U.S. Pat. No. 3,810,116, for VOLATILE MEMORY PROTECTION; U.S. Pat. No. 3,959,778 for APPARATUS FOR TRANSFERRING DATA FROM A VOLATILE MAIN MEMORY TO A STORE UNIT UPON THE OCCURRENCE OF AN ELECTRICAL SUPPLY FAILURE IN A DATA PROCESSING SYSTEM and U.S. Pat. No. 3,980,935 for VOLATILE MEMORY SUPPORT SYSTEM.

An early, typical, system for protecting data in the event of a power failure condition in an electronic postage meter is shown in U.S. Pat. No. 3,978,457 for MICROCOMPUTERIZED ELECTRONIC POSTAGE METER SYSTEM. In this system, when the supply voltage drops below a threshold level, a shut down signal is generated which causes the postage meter's microcomputer to initiate a shut down routine. As part of the shut down routine, the contents of a working, random access, memory are transferred to a non-volatile memory. Power is made available during the time period needed to detect the shut down signal and to transfer the register contents from the working memory to the non-volatile memory by providing the power supply with at least one large filter capacitor which discharges during a time interval of sufficient length to maintain a working voltage range during the time period.

Examples of more recent systems for protecting stored data in electronic postage meters upon the occurrence of power failure conditions may be found in U.S. Pat. No. 4,253,015 for an ELECTRONIC POSTAGE METER HAVING AN ACCOUNTING SYSTEM INDEPENDENT OF POWER FAILURE; U.S. Pat. No. 4,285,050 for an ELECTRONIC POSTAGE METER OPERATING VOLTAGE VARIATION SENSING SYSTEM; U.S. Pat. No. 4,323,987 for a POWER FAILURE MEMORY SUPPORT SYSTEM; U.S. Pat. No. 4,445,198 for a MEMORY PROTECTION CIRCUIT FOR AN ELECTRONIC POSTAGE METER; U.S. Pat. No. 4,534,018 for a NON-VOLATILE MEMORY PROTECTION CIRCUIT WITH MICROPROCESSOR INTERACTION; and U.S. Pat. No. 4,484,307 for an ELECTRONIC POSTAGE METER HAVING IMPROVED SECURITY AND FAULT TOLERANCE FEATURES.

In addition to the foregoing patents, the assignee of the present invention is the assignee of other inventions concerning the aforesaid subject matter, which inventions are disclosed in U.S. patent application SN 542,225 of Arno Muller, filed Oct. 14, 1983, for a POSTAGE METER WITH POWER FAILURE RESISTANT MEMORY; U.S. patent application Ser. No. 643,111 of Kirschner et al, filed Aug. 22, 1984, for a DATA PROTECTION SYSTEM FOR ELECTRONIC POSTAGE METERS HAVING MULTIPLE NON-VOLATILE MEMORIES; U.S. patent application Ser. No. 643,111 of Kirschner et al, filed Aug. 22, 1984 for an ELECTRONIC POSTAGE METER HAVING MULTIPLE NON-VOLATILE MEMORIES FOR STORING DIFFERENT HISTORICAL INFORMATION REFLECTING POSTAGE TRANSITIONS; and U.S. patent application Ser. No. 643,219, filed Aug. 22, 1984 for a NON-VOLATILE MEMORY SYSTEM WITH READ TIME AND POWER DOWN DATA STORAGE CAPABILITY FOR AN ELECTRONIC POSTAGE METER.

Thus, the problem of protecting postage meter operating data upon the occurrence of a power failure condition may be said to have been voluminously addressed by the art. However, the problem persists. And applicant's present invention resides in the provision of yet another solution to a relatively long standing problem, when considered in the light of the pace of development of computer technology, of protecting the operating data stored in an electronic postage meter upon the occurrence of a power failure condition. Accordingly:

An object of the present invention is to provide, in a postage meter including computer means having means for storing postage meter operating data, an improvement for protecting the operating data; and Another object is to provide in such a postage meter, wherein the computer means includes a microprocessor, means in the microprocessor for inhibiting the provision of a reset signal after power failure and until the operating data has been stored in a non-volatile memory.

SUMMARY OF THE INVENTION

In a postage meter which includes computer means, a power supply for energizing the computer means, a nonvolatile memory for storing postage meter operating data, and the computer means including a microprocessor adapted for processing the operating data, there is provided an improvement for protecting the operating data. The improvement comprises: the computer means including (a) means for detecting respective high level and low level output voltage signals from the power supply; (b) first switching means operable in response to the detection of a high level output voltage signal for providing a power-up signal to the microprocessor and operable in response to the detection of a low level output voltage signal for providing a power-down signal to the microprocessor; (c) second switching means operable in response to the detection of said high level signal for providing a not-reset signal to said microprocessor and operable in response to the detection of said low level signal for providing a reset signal to said microprocessor; and (d) means for enabling operation of the non-volatile memory after the microprocessor has been provided with the power-up and not-reset signals, the non-volatile memory enabling means including gate means operable in response to timely receiving at least two respectively predetermined input signals for enabling the microprocessor to transfer said operating data between the microprocessor and the non-volatile memory, the non-volatile memory enabling means including buffer means timely operable by the microprocessor for providing one of said two signals, and the microprocessor including means programmed for timely operating said buffer means and timely providing another of said two signals; and (e) third switching means responsive to operation of the buffer means for inhibiting the operation of the second switching means to prevent the provision thereby of a reset signal to the microprocessor after the microprocessor is provided with a power-down signal and until the microprocessor has transferred the operating data from the microprocessor to the non-volatile memory.

BRIEF DESCRIPTION OF THE DRAWINGS

As shown in the drawings wherein like reference numerals designate like or corresponding parts throughout the several figures.

DESCRIPTION OF THE PREFERRED EMBODIMENT

Figure 1:
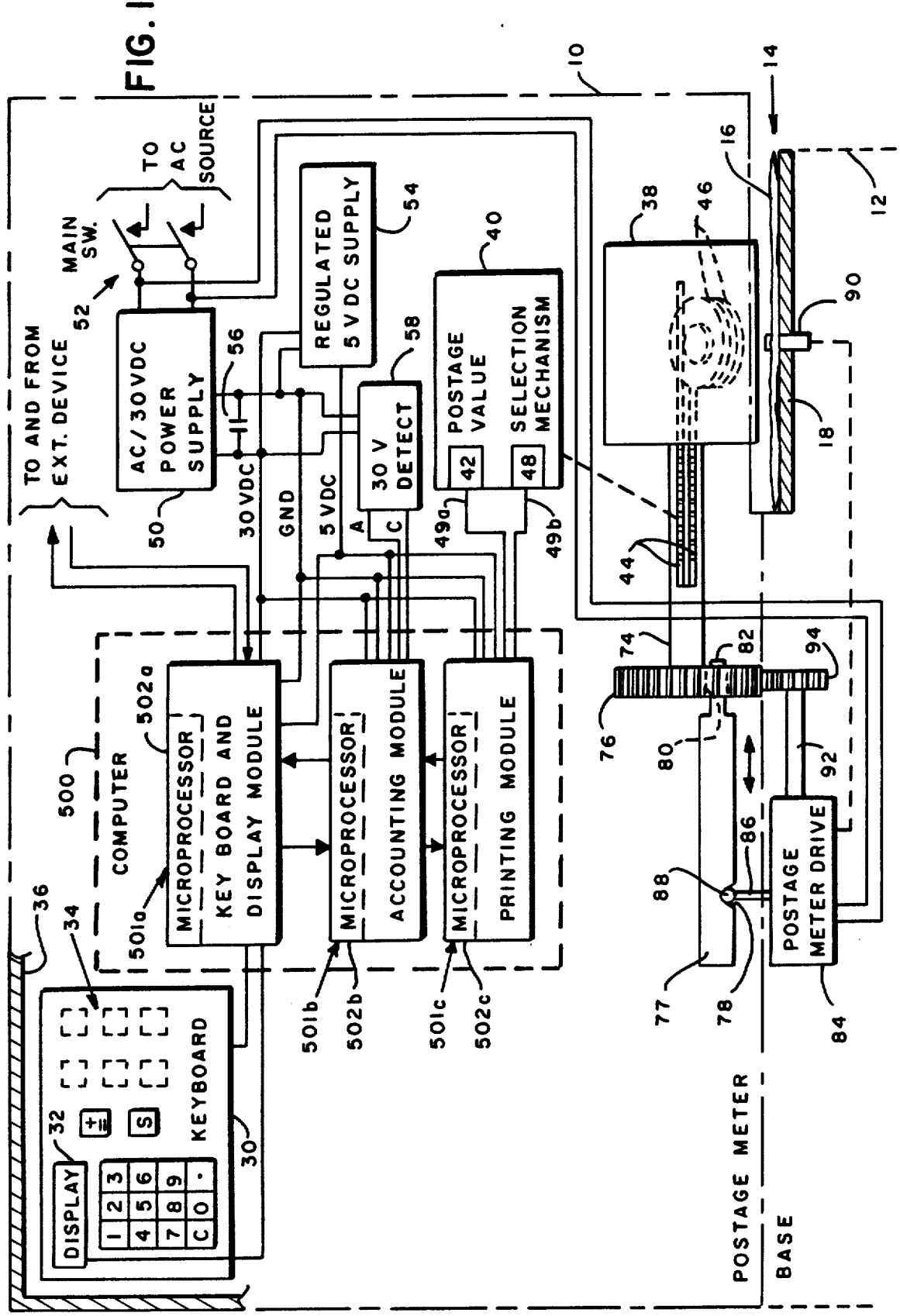
FIG. 1 is a schematic diagram of an electronic postage meter in which the apparatus according to the invention may be included.

As shown in FIG. 1, the apparatus in which the invention may be incorporated generally includes an electronic postage meter 10 which is suitably removably mounted on a conventional base 12, so as to form therewith a slot 14 into which respective sheets 16, including mailpieces, such as envelopes, cards or other sheet-like materials, may be inserted for disposition on a platen 18 connected to the base 12.

The postage meter 10 (FIG. 1) includes a keyboard 30 and a display 32. The keyboard 30 includes a plurality of numeric keys, labeled 0-9 inclusive, a clear key, labeled "c" and a decimal point key, labeled ".", for selecting postage values to be entered; and an arithmetic function key, labeled " ", for adding other, selected, postage charges (such as special delivery costs) to a previously selected value before entry of the total postage value, and a set postage key, labeled "s", for entering selected postage values. In addition, there is provided a plurality of display keys, designated 34, each of which is provided with a label, well known in the art, for identifying information stored in the meter 10 and shown on the display 32 in response to depression of the particular key 34, such as the "postage used", "postage unused", "control sum", "piece count", "batch value" and "batch count" values. A more detailed description of the keys of the keyboard 30 and the display 32, and their respective functions may be found in U.S. Pat. No. 4,283,721 issued Aug. 11, 1981 to Eckert, et al. and assigned to the assignee of the present invention.

In addition, the meter 10 (FIG. 1) includes a frame 36, on which the keyboard 30 and display 32 are conventionally mounted, and which is adapted by well known means for carrying a cyclically operable, rotary, postage printing drum 38. The drum 38 is conventionally constructed and arranged for feeding the respective sheets 16 in a path of travel which extends beneath the drum 38, and for printing entered postage on the upwardly disposed surface of each sheet 16. For postage value selecting purposes, the meter 10 also includes a conventional postage value selection mechanism 40, for example, of the type shown in U.S. Pat. No. 4,287,825 issued Sept. 8, 1981 to Eckert, et al. and assigned to the assignee of the present invention. The mechanism 40, which is operably electrically coupled via the postage meter's computer 500 to the keyboard 30 and display 32, includes a first stepper motor 42 for selecting any one of a plurality of slidably mounted racks 44 which are drivingly associated on a one for one basis with each of the print wheels 46, and a second stepper motor 48 for actuating each selected rack 44 for positioning the appropriate printing element of the associated print wheel 46 in printing relationship with respect to a sheet 16. The rack selection stepper motor 42, which is referred to by skilled artisans as a bank selector motor, is conventionally energized, via a power line 49a, from the computer 500 for selecting the appropriate rack 44; and the rack actuating stepper motor 48, which is referred to by skilled artisans as a digit selector motor, is conventionally energized, via a power line 49b, from the computer 500 to move the selected rack 44 for selecting the appropriate printing element of the print wheel 46 for printing purposes. A more detailed description of the value selection mechanism 40 may be found in the aforesaid U.S. Pat. No. 4,287,825.

The computer 500 (FIG. 1) for the postage meter 10 generally comprises a conventional, microcomputer system having a plurality of microcomputer modules including a control or keyboard and display module, 501a, an accounting module 501b and a printing module 501c. The control module 501a is both operably electrically connected to the accounting module 501b and adapted to be operably electrically connected to an external device via respective two-way serial communications channels, and the accounting module 501b is operably electrically connected to the printing module 501c via a corresponding two-way serial communication channel. In general, each of the modules 501a, 501b and 501c includes a dedicated microprocessor 502a, 502b or 502c, respectively, having a separately controlled clock and programs. And two-way communications are conducted via the respective serial communication channels utilizing the echoplex communication discipline; wherein communications are in the form of serially transmitted single byte header-only messages, consisting of ten bits including a start bit followed by an 8 bit byte which is in turn followed by a stop bit, or in the form of a multi-byte message consisting of a header and one or more additional bytes of information; and wherein each transmitted bit is returned to the transmitter, for validation purposes, as it is received. Further, all transmitted messages are followed by a no error pulse if the message was received error free. In operation, each of the modules 501a, 501b and 501c is capable of processing data independently and asynchronously of the other. In addition, to allow for compatibility between the postage meter 10 and any external apparatus, all operational data transmitted to, from and between each of the three modules 501a, 501b and 501c, and all stored operating data, is accessible to the external device via the two-way communication channel, as a result of which the external apparatus (if any) may be adapted to have complete control of the postage meter 10 as well as access to all current operational information in the postage meter 10. In addition, the flow of messages to, from and between the three internal modules 501a, 501b and 501c is in a predetermined, hierarchical direction. For example, any command message from the control module 501a is communicated to the accounting module 501b, where it is processed either for local action in the accounting module 501b and/or as a command message for the printing module 501c. On the other hand, any message from the printing module 501c is communicated to the accounting module 501b where it is either used as internal information or merged with additional data and communicated to the control module 501c. And, any message from the accounting module 501b is initially directed to the printing module 501c or to the control module 501a. A more detailed description of the various prior art modules 501a, 501b and 501c, and various modifications thereof, may be found in U.S. Pat. Nos. 4,280,180; 4,280,179; 4,283,721 and 4,301,507; each of which patents is assigned to the assignee of the present invention.

The postage meter 10 (FIG. 1) includes an AC/DC power supply 50 which is adapted to be connected to a local source of supply of AC power via a normally open main power switch 52 which may be closed by the operator. Upon such closure, the postage meter's AC/DC power supply 50, and regulated 5 V DC power supply 54, are energized for supplying each of the modules 501a, 501b and 501c with local 5 volt DC and 30 volt DC sources.

The postage meter 10 (FIG. 1) additionally includes a conventional large capacity capacitor 56, which is connected across the 30V DC power supply output leads, 30 V DC and GND. The capacitor 56 is provided to act as a temporary source of supply of DC power upon reopening the main power switch 52 or upon the occurrence of a power supply failure or other major fluctuation in available power. The postage meter 10 also includes a conventional 30 V DC power detection circuit 58 which is preferably suitably electrically connected to the accounting module 501b via the leads A and C, for signaling the accounting module 501b when 30 V DC is initially available from the 30 V DC supply 50 and when the voltage level thereafter falls from 30 V DC to a predetermined reference voltage level which is much less than the 30 V DC level.

The postage meter 10 (FIG. 1) further includes a conventional, rotatably mounted, shaft 74 on which the drum 38 is fixedly mounted and in which the racks 44 are slidably mounted, a conventional drive gear 76, which is fixedly attached to the shaft 74 for rotation of the shaft 74, and a conventional, suitably reciprocally mounted, shutter bar 77 which has a bearing cavity 78. The drive gear 76 has an aperture 80 which is formed therein to receive the adjacently disposed end 82 of the shutter bar 77. For reciprocally moving the shutter bar 77, the base 12 includes a conventional postage meter drive unit 84 which includes means for actuating the shutter bar 77. The drive unit 84 includes a pivotally mounted shutter bar driving lever 86 having a free end 88 which is configured for disposition in bearing engagement with the shutter bar's bearing cavity 78. The drive unit 84 suitably operably drives the lever 86 for timely withdrawing the shutter bar 77 from the aperture 80 in response to a sheet 16 engaging a trip lever 90 which is conventionally operatively connected to the drive unit 84. The trip lever 90 extends into the slot 14 for sensing the insertion of a sheet 16 into the slot 14. When the trip lever 90 is engaged by a sheet 16, the drive unit 84 causes the lever 86 to timely withdraw the shutter bar 77 from the aperture 80 of the drum drive gear 76 to permit rotation of the gear 76, and to then timely drive the shaft 92, and thus the drive gear 94 attached to the drum shaft 92, for driving the drum drive gear 76 through one revolution. Whereupon the selected postage value is printed on a sheet 16 by the drum 38 as the drum 38 feeds the sheet 16 from the platen 18. The drive unit 84 thereafter conventionally timely pivots the lever 86 for resetting the shutter bar 77 into the aperture 80 of the drum drive gear 76. Thus the drive unit 84 normally responds to actuation of the trip lever 90 by withdrawing the shutter bar 77 from the gear 76, driving the drum 38 through a single revolution, and then resetting the shutter bar 77 in the drum drive gear 76 to prevent further rotation of the drum 38 until the trip lever 90 is again actuated.

Figure 2:
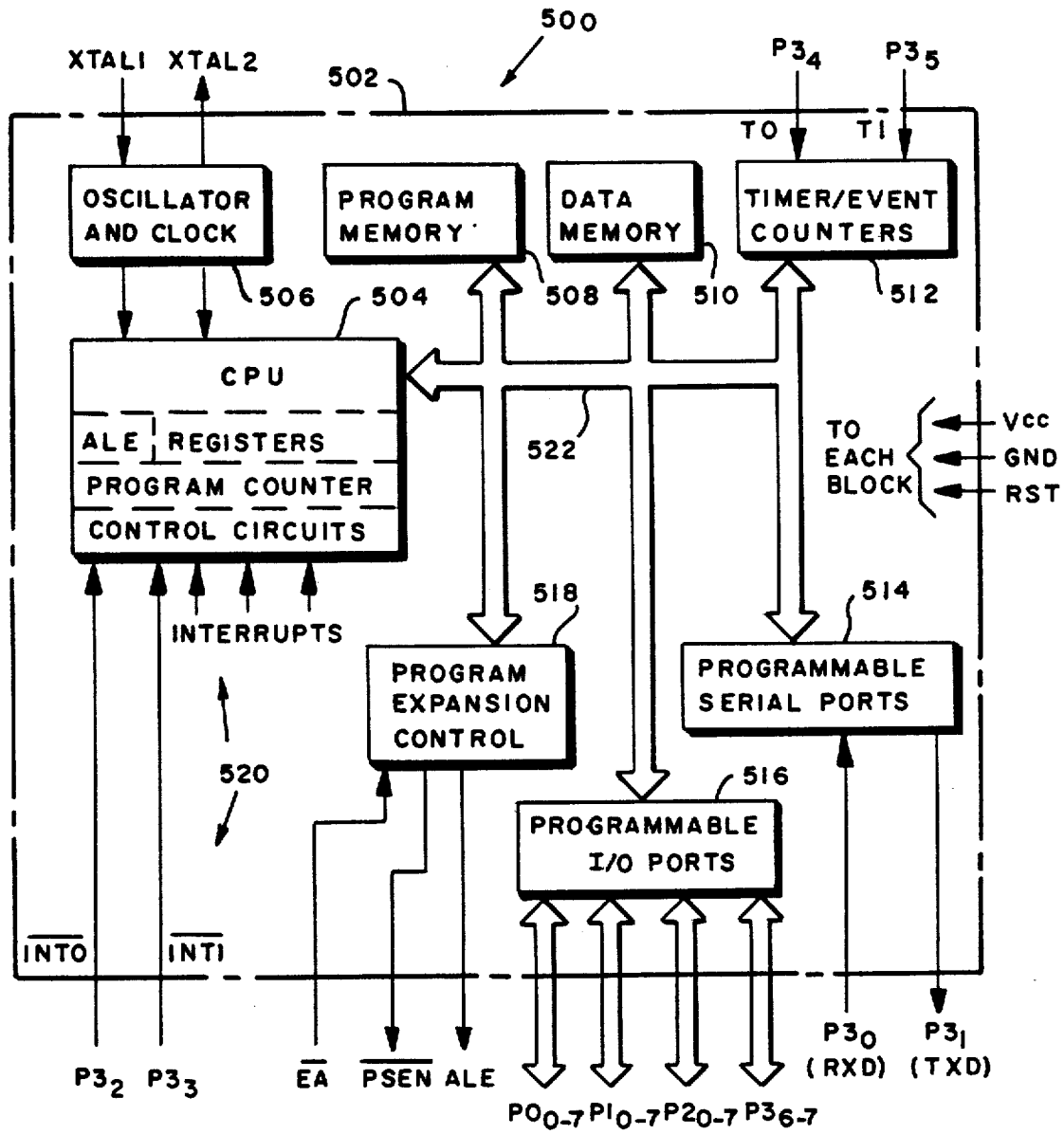
FIG. 2 is a microprocessor of the type which may be utilized for controlling the apparatus according to the invention.

As shown in FIG. 1 the computer 500 includes separate microprocessors 502a, 502b and 502c. Preferably each of these microprocessors, i.e., 502 (FIG. 2), is a conventional, inexpensively commercially available, high speed microprocessor, such as the Model 8051 single chip microprocessor commercially available from Intel Corporation, 3065 Bowers Avenue, Santa Clara, Calif. 95051. The microprocessor 502, generally comprises a plurality of discrete circuits, including those of a control processor unit or CPU 504, an oscillator and clock 506, a program memory 508, a data memory 510, timer and event counters 512, programmable serial ports 514, programmable I/O ports 516 and control circuits 518, which are respectively constructed and arranged by well known means for executing instructions from the program memory 508 that pertain to internal data, data from the clock 506, data memory 510, timer and event counters 512, serial ports 514, I/O ports 516 interrupts 520 and/or bus 522, and providing appropriate outputs from the clock 506, serial ports 514, I/O ports 516 and timer 512. A more detailed discussion of the internal structural and functional characteristics and features of the Model 8051 microprocessor, including optional methods of programming port 3 for use as a conventional bi-directional port, may be found in the Intel Corporation publication entitled MCS-51 Family of Single Chip Microcomputers Users Manual, dated January 1981.

Figure 3A:
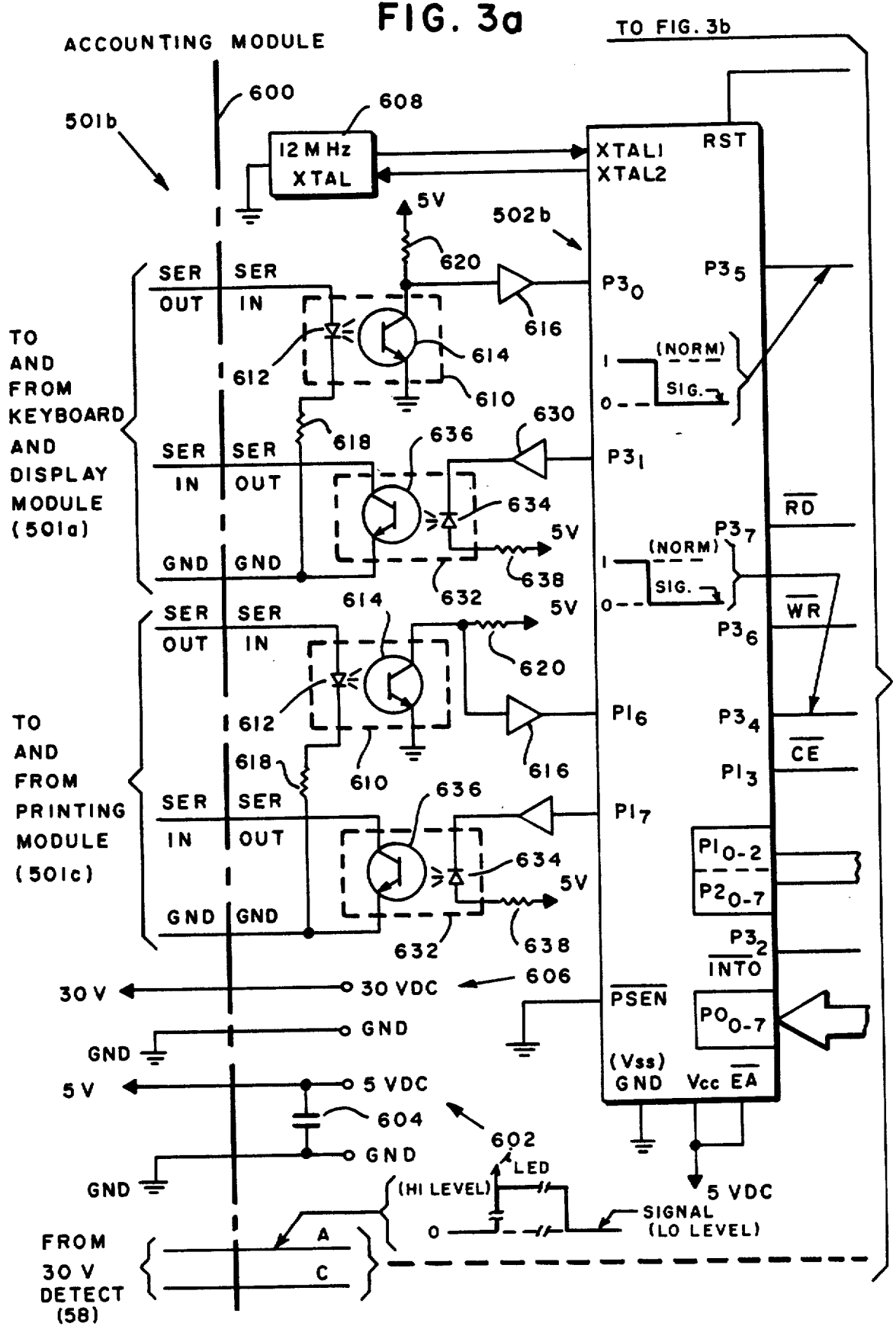
FIG. 3 (including FIGS. 3a, 3b and 3c) is a circuit diagram of an accounting module including apparatus according to the invention.
Figure 3B:
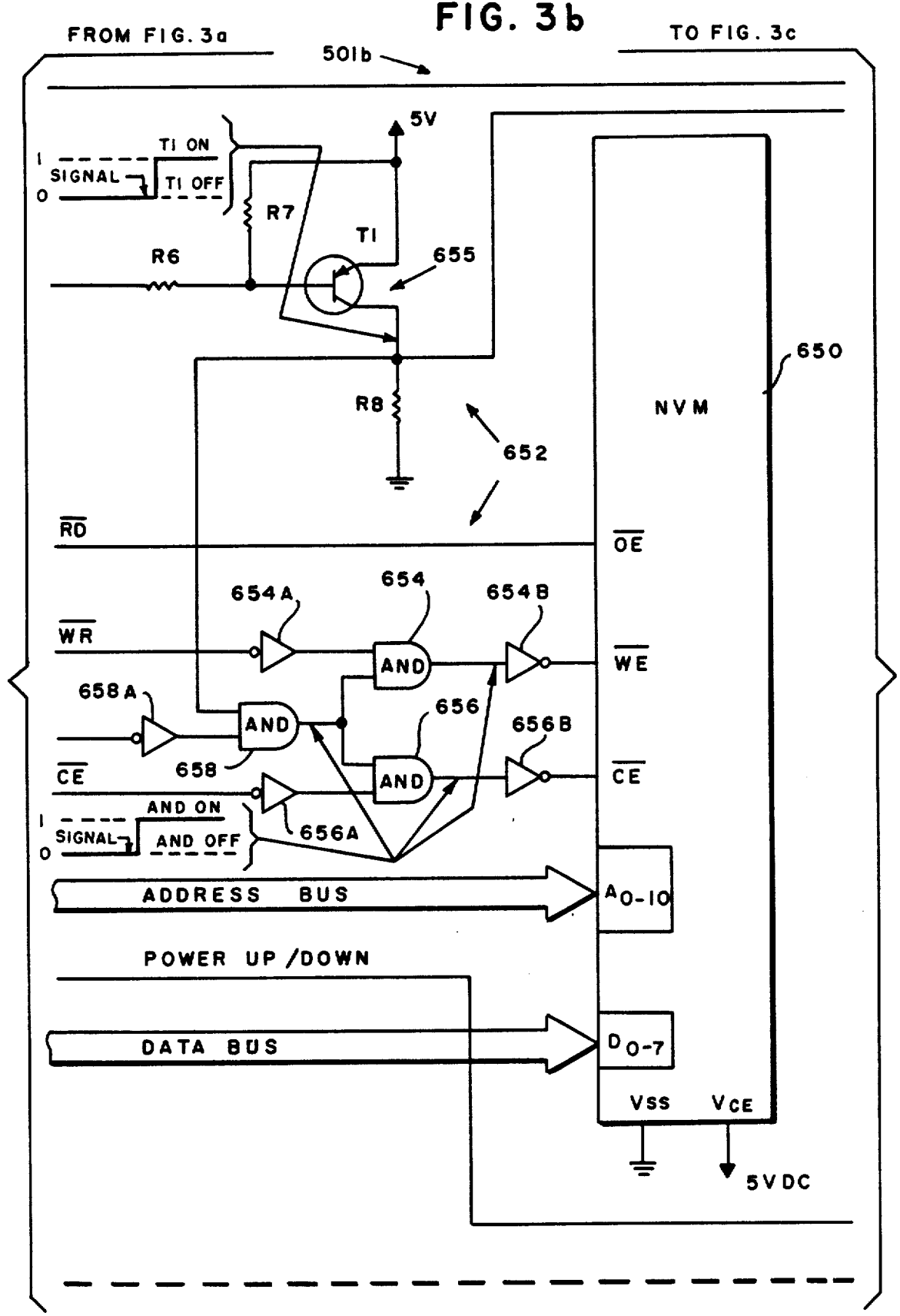
Figure 3C:
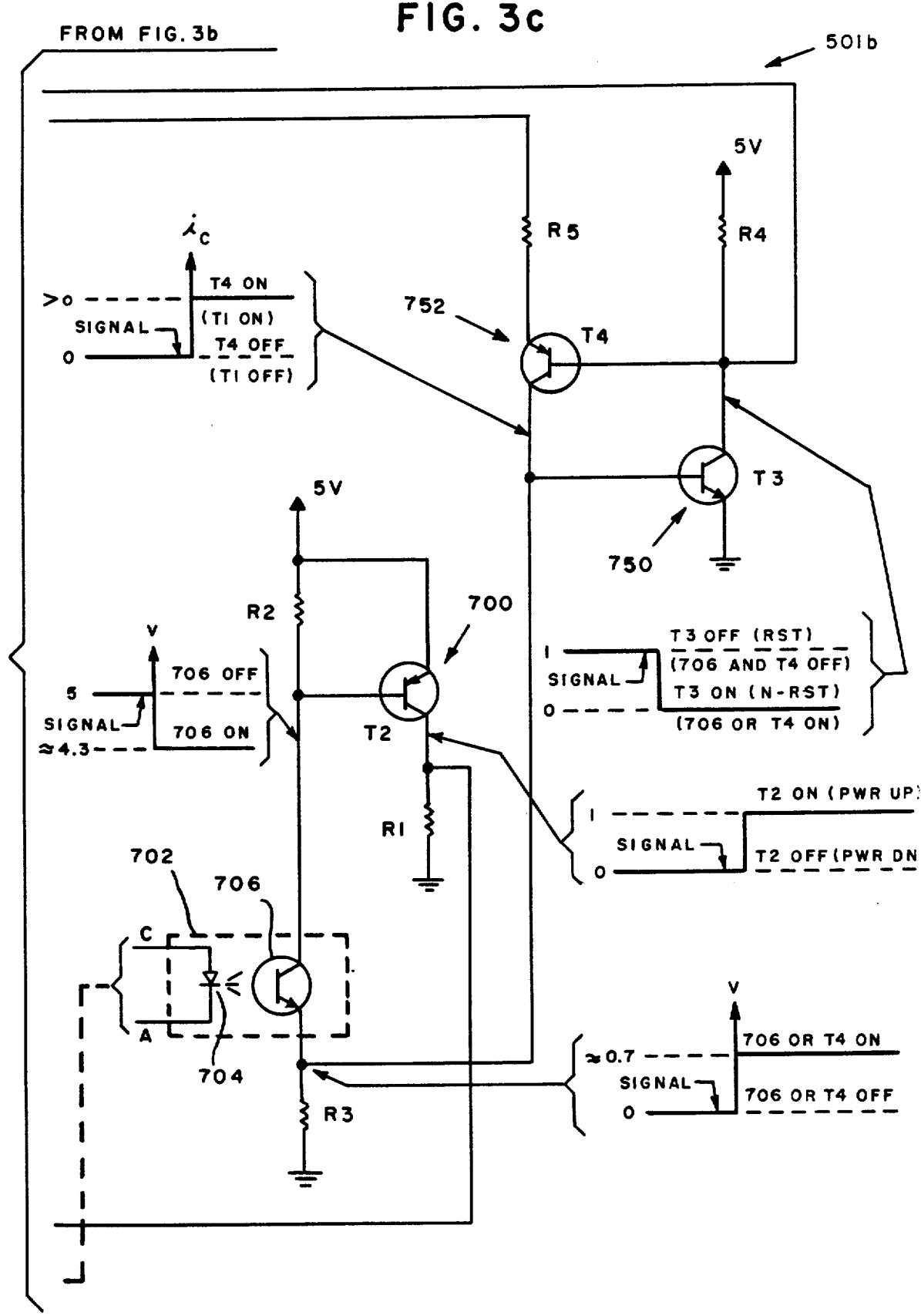

As shown in FIG. 3, to facilitate maintenance of the accounting module 501b, the module's components are preferably mounted on a separate printed circuit board which is removably interconnected with the remainder of the postage meter's components via a conventional connector located along the dot-dash line 600. The accounting module 501b preferably includes a local 5 V DC source 602 and its associated ground return lead GND, which are respectively adapted to be connected via 5 V DC source and ground return leads to the postage meter's 5 V DC and GND leads. Preferably, the module's 5 V DC source 602 is shunted to its associated ground return lead GND by means of suitable filter capacitor 604. The module 501b also includes a local 30 V DC source 606 and associated ground return lead GND, which respectively extend from the module 501b for conventional interconnection to the postage meter's 30 V DC supply 50 (FIG. 1). In addition, as shown in FIG. 3, the VCC and VSS terminals of the microprocessor 501b are conventionally connected to the module's 5 V DC source 602 and GND. Also, since the microprocessor 502c does not utilize an external program memory, the microprocessor's PSEN terminal is connected to the module's local ground return GND. Further, the $\overline{EA}$ terminal is also conventionally connected to the module's local ground GND. In addition, the microprocessor 502b is preferably equipped with a conventional 12 MHz crystal circuit 608 which is conventionally connected to the module's ground GND and to the microprocessor's XTAL1 and XTAL2 terminals. And, it is understood that although not shown in each instance, each of the I/O ports of the microprocessor 502b are conventionally connected to the 5 V DC source via a suitable pull-up resistor.

As shown in FIG. 3, serial output communications from the keyboard and display module 501a are received via a serial input lead which is conventionally coupled to the serial input port $P3_0$ of the accounting module's microprocessor 502b via a conventional optical-electrical isolator circuit 610, connected in series with a conventional buffer circuit 616. The optical-electrical isolator circuit 610 includes an LED 612 and photo-responsive transistor 614. The serial input lead of the accounting module 501b, which is connected to the serial output lead of the keyboard and display module 501a, is suitably electrically connected to the cathode of the LED 612, the anode of which is connected via a conventional resistor 618 to the ground return lead GND to the keyboard and display module 501a. The collector of the photo-transistor 614 is connected to the module's local 5 V DC source 602 via a load resistor 620 and to the input of the buffer circuit 616; whereas, the emitter of the photo-transistor 614 is connected to the accounting module's local ground lead GND. The load resistor 620 acts as a pull-up resistor for the buffer circuit 616, the output of which is connected to port $P3_0$ of the accounting module 502b. Thus, serial input communications from the keyboard and display module 501a are electrically isolated from the accounting module's internal circuitry. Port $P3_0$ is conventionally programmed for serial input communications purposes. Port $P3_1$ of the accounting module 502b, which is conventionally programmed for serial output communications purposes, is correspondingly conventionally coupled to the serial output lead of the accounting module 501b, for connection to the serial input lead of the keyboard and display module 501a via another conventional buffer circuit 630 connected n series with another conventional optical-electrical isolator circuit 632. The circuit 632 includes an LED 634 and photo-responsive transistor 636. Port $P3_1$ is conventionally connected to the input of the buffer circuit 630, the output of which is connected to the anode of the LED 634 which has its cathode connected to the accounting module's local 5 V source 602 via a suitable resistor 638. The collector of the photo-responsive transistor 636 is connected to the serial output lead of the accounting module 501b. And the emitter of the photo-responsive transistor 636 is connected to the serial communications ground return lead GND. Thus, serial output communications to the keyboard and display module 501a are electrically isolated from the accounting module's internal circuitry. Accordingly, the internal circuitry of the accounting and the keyboard and display modules 502b and 502a are electrically isolated from each other.

Since the foregoing discussion applies with equal force to serial communications channels between the accounting module 502b (FIG. 3) and printing module 501c, the structural components interconnecting the printing module's serial communications leads to ports $P1_6$ and $P1_7$ of the accounting module's microprocessor 502b are respectively numbered to correspond to those interconnecting the keyboard and display module's serial communications leads to ports $P3_0$ and $P3_1$ of the microprocessor 502b. And, it is noted that ports $P1_6$ and $P1_7$ are respectively conventionally programmed for serial communications purposes and a separate ground return lead GND is associated with the serial communications lines which are connected to the printing module 501c. Accordingly, the internal circuitry of the accounting and printing modules 502a and 502b are electrically isolated from each other.

To accommodate the non-volatile memory needs of the accounting module 501b (FIG. 3), the module 501b includes a conventional Non-Volatile Memory (NVM) circuit 650 which is operably electrically coupled to the microprocessor 502b. The NVM circuit's respective VCC and VSS terminals are conventionally connected to the module's 5 V DC source 602 and ground return GND. Preferably the NVM circuit 650 is one having a relatively large storage capacity such as a Model 5213H Electrically Erasable Read Only Memory ($E^2ROM$) currently available from Seeq Technology, Incorporated, 1849 Fortune Drive, San Jose, Calif. 9513. Due to the relatively large capacity of the NVM circuit 650, the address lines include eleven address lines extending between the microprocessor 502b and NVM circuit 650. Accordingly, terminals $P1_{0-2}$ and $P2_{0-7}$ of the microprocessor are conventionally interconnected, serially and on a one-for-one basis, to the eleven address terminals $A_{0-10}$ of the NVM circuit 650. And, for two way data communications between the microprocessor 502b and NVM circuit 650, the eight data terminals $PO_{0-7}$ of the microprocessor and the eight data terminals $D_{0-7}$ of the NVM circuit 650 are conventionally electrically interconnected to each other, serially and on a one-for-one basis. To avoid inadvertent loss or alteration of the data stored in the NVM circuit 650 due to spurious signals, circuit failures and the like, the chip enable, write enable and output enable functions of the NVM circuit 650 are protected by a fail-safe NVM enabling circuit 652. The NVM enabling circuit 652 normally disables operation of the NVM circuit 650 and is operable for enabling operation of the NVM circuit 650. The NVM enabling circuit 652 is operable in response to a plurality of predetermined input signals being timely provided to the NVM enabling circuit 652 by the microprocessor 502b for operably coupling the NVM circuit's chip and write enable terminals, $\overline{CE}$ and $\overline{WE}$, respectively, to the microprocessor's chip enable and write terminals, $\overline{CE}$ and $\overline{WR}$.

As shown in FIG. 3, the NVM enabling circuit 652 includes a first AND gate 654 having one of its inputs suitably connected via a signal inverting buffer circuit 654A to port $P3_6$, the write terminal $\overline{WR}$ of the microprocessor 502b, and having its output suitably connected via a signal inverting buffer circuit 654B to the write enable terminal $\overline{WE}$ of the NVM circuit 650. In addition, the fail-safe circuit 652 includes a second AND gate 656, having one of its inputs connected via a signal inverting buffer circuit 656A to port $P1_3$, the chip enable terminal $\overline{CE}$ of the microprocessor, and its output connected via a signal inverting buffer circuit 656B to the chip enable terminal $\overline{CE}$ of the NVM circuit 650. In addition, port P3₄ of the microprocessor is conventionally programmed as an output port and is connected via a signal inverting buffer circuit 658A to one of the input terminals of a AND gate 658, which has its output connected to each of the other inputs of the AND gates 654 and 656. According to the invention, the NVM enabling circuit 652 preferably additionally includes a conventional transistor buffer circuit 655 which is connected between the microprocessor 502b and the other input terminal of the AND gate 658, to facilitate dual usage of output signals from port P3₅ of the microprocessor 502b. The transistor buffer circuit 655 includes a conventional PNP transistor T1, the base of which is resistively coupled to port P3₅ of the microprocessor 502b by means of a resistor R6 for receiving drive signals from the microprocessor 502b; the base of which is also resistively connected to the meter module's 5 V DC source 602 by means of resistor R7 to normally bias the base for holding the transistor T1 in its non-conductive state; the emitter of which is connected to the meter module's 5 V DC source 602; and the the collector of which is resistively coupled to the module's ground return GND by means of a suitable resistor R8. Further, the collector of the transistor T1 is conventionally connected to the other terminal of the AND gate 658, for coupling the output signal from the collector of the buffer circuit 655 to the AND gate 58. The additional lead connected to the collector of transistor T1, which lead does not effect the operation of the NVM enabling circuit 652, is provided for additionally coupling the output signal from the collector of the buffer circuit 655, as hereinafter more fully discussed, to a reset enabling circuit for inhibiting operation of the same for a predetermined time interval. Since the read enable function of the NVM circuit 650 is dependent upon the chip enable function, the fail-safe circuit 652 also includes a conventional interconnection between port P3₇, the read terminal $\overline{RD}$ of the microprocessor 502b, and the output (read) enable terminal $\overline{OE}$ of the NVM circuit 650.

As hereinbefore discussed, the base of transistor T1 (FIG. 3) is normally biased to hold transistor T1 in its nonconductive state. Accordingly, the output signal from the collector of the transistor T1 is normally held at a low voltage, or logical zero level, whereby the input signal to the AND gate 658 from the collector of transistor T1 is normally a logical zero level signal. As a result, the AND gate 658 is disabled whether or not the signal from terminal P3₄ of the microprocessor 502b to the AND gate 658 is a high or low logical level signal. Correspondingly, the signal from terminal P3₄ of the microprocessor 502b is normally a logical one level signal, which, when inverted by the buffer 658A is applied as a logical zero level signal to the AND gate 658, as a result of which the AND gate 658 is disabled whether or not the signal from the collector of the transistor T1 to the AND gate 658 is a high or low logical level signal. And, since the output of the AND gate controls the transmission of signals from the microprocessor 502b to the chip enable $\overline{CE}$ and write enable $\overline{WE}$ terminals of the NVM circuit 650, normal operation of the NVM circuit 650 is disabled when the transistor T1 is non-conductive since the AND gate 658 is disabled.

In order to enable normal operation of the NVM circuit 650, it is preferable that two conditions be met. One of such conditions is that a low level signal from port P3₅ of the microprocessor 502b be supplied to the base of transistor T1 for driving the transistor T1 into its conductive state, thereby closing the circuit from the 5 V DC source 602, through the emitter-collector circuit of transistor T1 and through the resistor R8 to ground; as a result of which a high voltage or logical one level signal is applied to one of the inputs of the AND gate 658 from the collector of the transistor T1. The other of such conditions is that at the same time as the logical one level signal is being applied to the AND gate 658 from the collector of transistor T1, a high voltage or logical one level signal be applied to the other input terminal of the AND gate 658 by supplying a logical zero level signal at from port P3₄ of the microprocessor 502b. In response to the simultaneous presence of high logical level input signals at the respective inputs of the AND gate 658, a high voltage or logical one level signal from the output of the AND gate 658 will be applied to one of the terminals of each of the AND gates 654 and 656, thereby enabling normal operation of the NVM circuit 650. Upon such enablement, the NVM circuit 650 is operable to receive and store data in response to the application to the other respective terminals of the AND gates 654 and 656 of appropriate signals from the microprocessor's chip enable and write terminals, $\overline{CE}$ and $\overline{WR}$, due to the resulting signals from the outputs of the respective AND gates 654 and 656 being applied to the NVM circuit's respective chip enable and write enable terminals, $\overline{CE}$ and $\overline{WE}$. Similarly, appropriate read signals from the microprocessor's chip enable and read terminals, $\overline{CE}$ and $\overline{RD}$ may be applied to the NVM circuit's respective chip enable and output enable terminals, $\overline{CE}$ and $\overline{OE}$, to effectuate normal operation of the data reading function of the NVM circuit 650.

Due to the de mininus probability of spurious signals coincidently duplicating the preferred signaling requirements of the gates 654, 656, and 658, the safety against loss of critical operating data stored in the microprocessor 502b and NVM circuit 650 is greatly enhanced, for example, in the event of the accounting module 501b experiencing a power failure condition.

For delaying operation of the postage meter 10 (FIG. 1) until the 30 V DC power supply 50 is operative, the accounting module 501b (FIG. 3) preferably includes a conventional switching circuit 700 which is electrically coupled to the thirty volt detection circuit 58 (FIG. 1) by means of a suitable optical-electrical circuit 702 (FIG. 3) for electrically isolating the accounting module 501b from the remaining components of the postage meter 10. The optical-electrical coupling circuit 702 includes an LED 704 and photo-responsive transistor 706. The LED 704 has respective anode and cathode leads, A and C, extending from the circuit 702 and normally conventionally interconnected to the 30 volt detection circuit 58 (FIG. 1). And the photo-responsive transistor 706 (FIG. 3) has respective collector and emitter leads extending from the circuit 702 and conventionally connected to the accounting module's 5 V DC supply and ground leads via the respective resistors R2 and R3. The switching circuit 700 comprises a conventional PNP transistor T2, the base of which is connected to the collector of the photo-transistor 706 for driving thereby, and which is also connected to the 5 volt source via the aforesaid resistor R2 for normally biasing the base of transistor T2 to its non-conductive state. The emitter of the transistor T2 is directly connected to the accounting module's 5 volt source, and the collector is connected both to the module's ground lead via a resistor R1, and to port P34 of the microprocessor 502b for providing respective power up and down input signals to the microprocessor 502b. Thus the output from the switching circuit 700 is connected to a microprocessor interrupt $\overline{\text{INTO}}$.

Upon closing the main switch 52 (FIG. 1) of the postage meter 10, the AC/30 V DC power supply 50 and the thirty volt detection circuit 58 are respectively energized. Accordingly, when thirty volts is detected across the output leads 30 V DC and GND, the LED 704 (FIG. 3) of the switching circuit 702 is caused to conduct. Whereupon, the LED 704 drives the phototransistor 706 to its conductive state, closing the circuit from the 5 volt source through R2, through the collector-emitter circuit of the phototransistor and through R3 to ground. The resulting output signal from the collector of the photo-transistor 706 is applied to base of transistor T2 to drive it to its conductive state, closing the circuit from the 5 volt source through the emitter-collector circuit of the transistor T2 and through the resistor R1 to ground. In addition, the resulting output signal across R1 is applied to port $P3_2$ of the microprocessor via the power up/down lead, thereby removing the low level interrupt to inform the microprocessor 502b that the 30 volt supply is available for operation of the accounting module 501b.

For controlling the reset function of the microprocessor 502b (FIG. 3) the postage meter 10 includes a reset enabling circuit 750, a reset inhibiting circuit 752 and operation of the NVM enabling circuit 652 in a reset inhibiting mode of operation. The reset enabling circuit 750 is preferably a conventional switching circuit including a conventional NPN transistor T3. The transistor T3 has its base connected to the accounting module's ground via the resistor R3 and thus to the emitter of the photo-transistor 706, its emitter directly connected to the accounting module's ground GND, and its collector connected to the microprocessor's reset port RST and to the accounting module's 5 V DC source via a load resistor R4. The reset inhibiting circuit 752 is preferably a conventional switching circuit including a conventional PNP transistor T4. The transistor T4 has its base connected to the accounting module's 5 V DC source via the aforesaid resistor R4 and thus to the collector of the transistor T3 and to the microprocessor's reset port RST, its collector connected to the emitter of the photo-transistor 706 and thus to the base the transistor T3, and its emitter connected to the collector of the transistor T1 via a load resistor R5 and thus to the accounting module's ground via the resistor R8.

As previously discussed, upon detection of the presence of 30 volts across the output of the 30 V DC supply (FIG. 3) the LED 704 illuminates the base of the phototransistor 706 thereby causing it to be driven to its conductive state. Whereupon the signal from the collector of the photo-transistor 706 drives the transistor T2 to this conductive state, and the transistor T2, in turn, provides a power-up signal to the microprocessor 502b indicating that DC power is available for operation of the microprocessor 502b and NVM circuit 650. In addition, the signal from the emitter of the photo-transistor 706, which is coupled to the base of the transistor T3 drives the transistor T3 into its conductive state. Thus the collector of the transistor T3 is clamped to ground.

The low level signal from the collector of transistor T3, when applied to the reset port RST, removes the high level reset signal from the reset port RST, or otherwise stated, applies a not-reset signal to the reset port RST. Whereupon the microprocessor 502b implements a conventional initialization routine, including providing the appropriate logic signals to ports $P3_4$ and $P3_5$, for enabling normal operation of the NVM circuit 650; such normal operation including applying the previously mentioned low level signal to port $P3_4$ for effectuating application of a high level logic signal to one of the inputs of the AND gate 658 and applying a low level signal to port $P3_5$ for driving the NVM enabling circuit's transistor T1 into its conductive state, whereby the other terminal of the AND gate 658 is provided with a high level logic signal from the collector of the transistor T1. When this occurs, the 5 V signal from the collector of transistor T1 is also applied to the emitter of the reset inhibiting circuit transistor T4, which is driven into conduction due to the base of transistor T4 having previously been clamped to ground by the transistor T3. As a result, transistor T4 closes the circuit from the 5 V supply level at the collector of the buffer circuit transistor T1, through the resistor R5, through the emitter-collector circuit of the reset inhibiting circuit's transistor T4 and through the resistor R3 to ground. Whereupon, the base of the transistor T3 will be held at the level of the voltage across the resistor R3 due to the conduction of the transistor T4, whether or not the photo-transistor 706 has become non-conductive, for example, upon the occurrence of a loss of power sufficient to extinguish the LED 704, i.e., conventionally, a loss of approximately 20% of the detected 30 V DC level. Accordingly, assuming intentional shut down of the postage meter 10, which is normally the cause of the LED 704 becoming non-conductive, or a power fluctuation causing a power loss sufficient to cause the LED 704 to become non-conductive, although the switching circuit's transistor T2 is switched to its non-conductive state, causing the power-up signal at port $P3_2$ of the microprocessor to be replaced by a power-down or low level signal, a reset signal will not be applied to the reset port RST of the microprocessor 502b. Rather, the reset inhibiting circuit 752 will hold the clamping circuit's transistor T3 in its conductive state, whereby the microprocessor 501b continues to provide a low level not-reset signal. On the other hand, application of the power-down signal to port $P3_2$ of the microprocessor 502b causes the microprocessor 502b to initiate a conventional power-down subroutine, including the initial steps of first transferring from the microprocessor 502b to the NVM circuit 650 the operating data which is normally in the microprocessor 502b and is to be stored in the NVM circuit 650 whenever the postage meter 10 is deenergized, and then changing the logical zero level signal at port $P3_5$ to a logical one level signal, whereby the NVM enabling circuit's transistor T1 is driven to its non-conductive state. Whereupon the transfer of additional data between the microprocessor and NVM circuits 502b and 650, is disabled, due to removal of the high level input signal at one of the input ports of the AND gate 658. In addition, the reset inhibiting circuit's transistor T4 is driven to its non-conductive state, due to removal of the 5 V DC signal from resistor R5; as a result of which the base of the clamping circuit's transistor T3 is connected to ground via the resistor R3, thereby switching the transistor T3 to its non-conductive state. Whereupon the collector of transistor T3 rises to the voltage of the 5 V DC supply for providing a high level reset signal to the microprocessor 502b, thereby preventing further processing by the microprocessor 502b.

The term postage meter as used herein includes any device for imprinting a value or other indicia on a sheet or sheet like material for governmental or private carrier parcel, envelope, package delivery purposes or for other printing purposes For example, private parcel or freight services purchase and employ postage meters for providing unit value pricing on tape for application on individual parcels.

Although the invention disclosed herein has been described with reference to a simple embodiment thereof, variations and modifications may be made therein by persons skilled in the art without departing from the spirit and scope of the invention. Accordingly, it is intended that the following claims cover the disclosed invention and such variations and modifications thereof as fall within the true spirit and scope of the invention.

What is claimed is:

1. In a postage meter including computer means, a power supply for energizing the computer means, a non-volatile memory for storing postage meter operating data, and the computer means including a microprocessor adapted for processing the operating data, an improvement for protecting the operating data, the improvement comprising:
   (a) the computer means including means for detecting respective high level and low level output voltage signals from the power supply;
   (b) the computer means including first switching means coupled to the detection means and operable in response to the detection of a high level output voltage signal for providing a power-up signal to the microprocessor and of a low level output voltage signal for providing a power-down signal to the microprocessor;
   (c) the computer means including second switching means coupled to the detection means and operable in response to the detection of a high level output voltage signal for providing a not-reset signal to said microprocessor and of a low level output voltage signal for providing a reset signal to said microprocessor;
   (d) the computer means including means for enabling operation of the non-volatile memory after the microprocessor has been provided with the power-up and not-reset signals, the non-volatile memory enabling means including gate means operable in response to timely receiving at least two respectively predetermined input signals for enabling the microprocessor to transfer operating data between the microprocessor and the nonvolatile memory, the non-volatile memory enabling means including buffer means timely operable by the microprocessor for providing one of said two signals, and the microprocessor including means programmed for timely operating said buffer means and timely providing another of said two signals; and
   (e) the computer means including third switching means operable in response to operation of the buffer means for inhibiting the operation of the second switching means to prevent the provision thereby of a reset signal to the microprocessor after the microprocessor is provided with a power-down signal and until the microprocessor has transferred the operating data from the microprocessor to the non-volatile memory.

2. The improvement according to claim 1 wherein the third switching means is coupled to the buffer means and to the second switching means and operable for preventing operation of the second switching means when said detection means detects a low level voltage signal.

3. The improvement according to claim 1, wherein said third switching means is coupled to the second switching means and operable by the buffer means for preventing said second switching means from being operated.

4. The improvement according to claim 1, wherein said second switching means is held in operation by said third switching means for causing said second switching means to continue to provide a not-reset signal to said microprocessor after said microprocessor is provided with a power-down signal.

5. The improvement according to claim 1, wherein said buffer means includes a signal- inverting buffer circuit.

6. The improvement according to claim 1, wherein said second switching means includes an NPN transistor having a base and an emitter and a collector, a first resistor connecting the collector to the power supply, said collector connected to the reset port of the microprocessor, said base connected to the detecting means, a second resistor connecting said base to ground, and said emitter connected to ground, whereby said second switching means is operable for clamping said reset port to ground for providing a not-reset signal to said microprocessor when said detection means detects a low level output voltage signal.

7. The improvement according to claim 6 wherein said third switching circuit includes a PNP transistor having another base and another emitter and another collector, said another base connected to the collector of said NPN transistor and thus to the power supply via said first resistor, and said another collector connected to the base of said NPN transistor and thus to said detecting means, said another base connected to ground via said second resistor, and said another emitter coupled to said buffer means for receiving a high logic level signal therefrom when said buffer means provides said one of said two signals, whereby said third switching circuit is operable to prevent said second switching circuit from detecting a low level voltage signal when said low level signal is detected by said detecting means.

* * * * *